United States Patent
Chen et al.

(10) Patent No.: US 9,602,762 B2
(45) Date of Patent: Mar. 21, 2017

(54) FALLBACK IN FRAME RATE CONVERSION SYSTEM

(71) Applicant: Sharp Laboratories of America, Inc., Camas, WA (US)

(72) Inventors: Xu Chen, Vancouver, WA (US); Petrus J. L. Van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 14/738,056

(22) Filed: Jun. 12, 2015

(65) Prior Publication Data

US 2016/0366367 A1   Dec. 15, 2016

(51) Int. Cl.
*H04N 7/01* (2006.01)
*G06T 7/00* (2006.01)
*G06T 5/00* (2006.01)

(52) U.S. Cl.
CPC .......... *H04N 7/0127* (2013.01); *G06T 5/003* (2013.01); *G06T 7/0002* (2013.01); *H04N 7/014* (2013.01); *G06T 2207/10016* (2013.01); *G06T 2207/20064* (2013.01); *G06T 2207/20201* (2013.01)

(58) Field of Classification Search
USPC ................................ 348/441, 443, 458, 459
See application file for complete search history.

(56) References Cited

U.S. PATENT DOCUMENTS

| | | | |
|---|---|---|---|
| 9,042,681 B1 * | 5/2015 | Namboodiri | H04N 7/014 382/300 |
| 2002/0021757 A1 | 2/2002 | Francois et al. | |
| 2003/0169933 A1 | 9/2003 | Song et al. | |
| 2008/0284908 A1 | 11/2008 | Chang | |
| 2009/0079876 A1 * | 3/2009 | Takeshima | G06T 3/4069 348/699 |
| 2010/0013989 A1 | 1/2010 | Zhou et al. | |
| 2010/0260255 A1 | 10/2010 | Sannidhi et al. | |
| 2011/0037895 A1 * | 2/2011 | Poon | H04N 5/144 348/453 |
| 2013/0136182 A1 * | 5/2013 | Huang | H04N 19/56 375/240.16 |
| 2014/0340570 A1 * | 11/2014 | Meyers | H04N 5/211 348/370 |
| 2015/0093015 A1 * | 4/2015 | Liang | G06K 9/6267 382/154 |
| 2016/0005154 A1 * | 1/2016 | Meyers | G06T 5/008 382/274 |

FOREIGN PATENT DOCUMENTS

JP   2011-35747 A   2/2011

OTHER PUBLICATIONS

Tong, Blur detection for digital images using wavelet transform, IEEE International Conference on Multimedia Expo, 2004, 4 pgs.
International Search Report, dated Sep. 13, 2016, PCT International App. No. PCT/JP2016/002820, SharpKabushiki Kaisha, 4 pgs.

* cited by examiner

*Primary Examiner* — Paulos M Natnael
(74) *Attorney, Agent, or Firm* — Chernoff Vihauer McClung & Stenzel, LLP

(57) ABSTRACT

A system for frame rate conversion of a video that includes detecting low quality of a received frame and determining an interpolated frame of the video based upon the detected low quality of the received frame.

16 Claims, 6 Drawing Sheets

FALLBACK IN FRAME RATE CONVERSION SYSTEM

CROSS-REFERENCE TO RELATED APPLICATIONS

None.

BACKGROUND OF THE INVENTION

For a digital video system, the video is encoded and decoded using a series of video frames.

Frames of a video are captured or otherwise provided at a first frame rate, typically a relatively low frame rate (e.g., 24 Hz or 30 Hz). A video presentation device often supports presenting the video at a second frame rate, typically a relatively high frame rate (e.g., 60 Hz or 120 Hz). With the difference in the frame rates, the video frame rate is modified from the first frame rate to the second frame rate using a frame rate up conversion process.

Frame rate up conversion techniques create interpolated frames using received frames as references. The frame interpolation may be obtained using a variety of different techniques, such as using a frame interpolation technique based on motion vectors of the received frames, such that moving objects within the interpolated frame may be correctly positioned. While the motion compensated frame rate up conversion process provides some benefits, it also tends to result in significant artifacts when the motion estimation is not sufficiently accurate.

Accordingly, there is a need to determine whether the motion-compensated frame rate up conversion is based upon a sufficiently high quality set of motion vectors. If the motion compensated frame rate conversion does not have sufficient quality, another frame rate up conversion, such as frame averaging or frame repetition, can be used as a substitute. However, accurate determination of the quality of the input frames is problematic in making such a determination.

The foregoing and other objectives, features, and advantages of the invention may be more readily understood upon consideration of the following detailed description of the invention, taken in conjunction with the accompanying drawings.

DETAILED DESCRIPTION OF PREFERRED EMBODIMENT

In frame rate up conversion, sometimes situations can occur where the process of motion compensated frame interpolation generates highly visible artifacts. The highly visible artifacts can be caused by several reasons. One reason is that the scene contains fast moving objects. The fast moving objects result in significant motion blur in the input frames. Another reason is due to the presence of extremely irregular or erratic motion which can result in spatial outliers in the estimated motion vector fields which could reduce the picture quality in the interpolated frame. Further, there is also the case when the consecutive video frames show very little correspondence with each other. Therefore with very little correspondence, motion compensation errors could be very significant. For such video content, frame rate up-conversion using frame repetition is typically preferred over motion compensated frame interpolation, since motion interpolation artifacts disappear, even though frame judder may be present. Perceptually, the human observer has difficulty tracking the (fast or complex) motion, making the re-appearance of judder a relatively minor issue. Motion based interpolation artifacts tend to remain more visible to the human observer in such cases and are more objectionable. This process of selectively using frame repetition (or other techniques not based upon the use of motion vectors) instead of motion compensated interpolation may be referred to as global fallback or global mode selection. Note that this process may be based on soft switching between the two modes or may be based on hard switching. Soft switching may be achieved by blending the results of both frame repetition and motion compensated frame interpolation using a weighted averaging technique.

A selective set of criteria should be used to determine when to switch between frame interpolation (e.g., a technique that is based, at least in part, on using motion) and frame repetition (e.g., a technique that is based, at least in part, without using motion). In particular selective switching from frame interpolation to frame repetition as a global fallback process based upon the selective set of criteria should be used. The noise level of the motion vector field and the temporal motion compensated error may be considered as conditions for global fallback. However, these two conditions only consider the motion vector field itself.

To improve the criteria for selecting global fallback, the detection of input frames containing sufficiently strong motion blur should be used. The motion blur determination for global fallback may further be based upon multiple criteria, such as, (a) detection of the quality of the input frames; (b) the temporal motion compensated errors based on non-overlapping blocks; and/or (c) the spatial motion vector outliers based on non-overlapping blocks.

Figure 1:
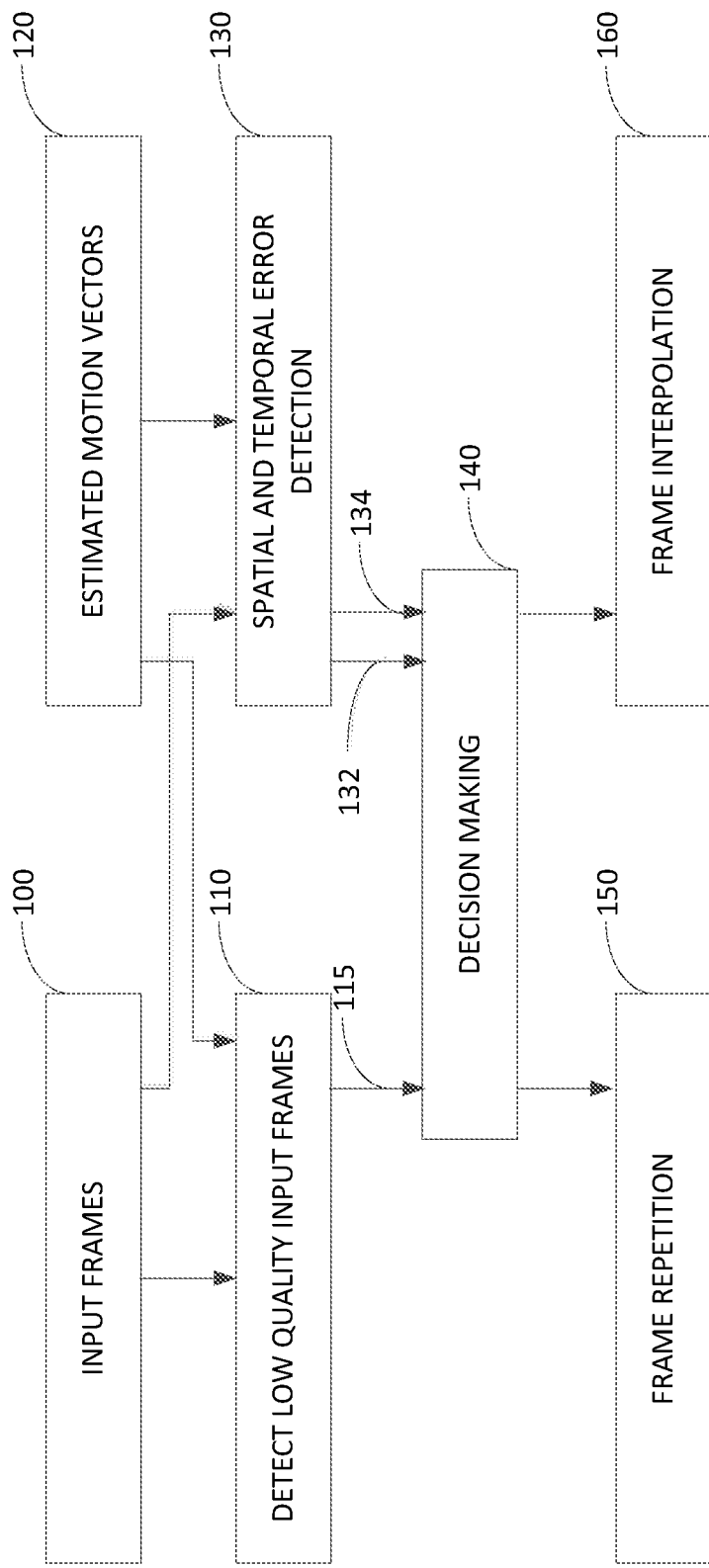
FIG. 1 illustrates a framework for global fallback.

FIG. 1 illustrates an overview of a framework for global fallback used in combination with frame rate up conversion. The framework can be described, for purposes of illustration, as two primary components. Each of the two components is individually making a decision as to whether to signal a choice of a global fallback process for a particular frame (e.g., frame repetition) and then the final decision as to whether to revert to the global fallback process can be based on a logic "OR" operation of the two components. Alternatively, the determination of whether to revert to the global fallback process may be based upon other operations. In the case of soft switching between the two global modes, each component may provide an individual confidence or weight value signaling relative preference for applying frame repetition or for motion compensated frame interpolation. The individual confidence or weight values are then combined in the final decision process. This may involve a simple arithmetic operation, for example taking the mean, maximum or other operator.

A series of frames of a video sequence may be received as input frames 100 for the first of the two components. The framework may detect low quality input frames 110 based upon the input frames 100 themselves and based upon estimated motion vectors 120 for the input frames 100. The framework may also include spatial and temporal error detection 130 based upon the estimated motion vectors 120. A decision making 140 process may be used to determine whether to use frame repetition 150 or frame interpolation 160, or to what extent each mode contributes to the final output frame.

One manner to characterize low quality input frames 110 is by the presence of strong motion blur. Strong motion blur often coincides with the presence of fast motion in the video (e.g. when the camera pans quickly), as well as the absence of strong edges and texture. For example, this often occurs in the video of sports programs. Strong motion blur often presents difficulties for accurate motion estimation. As a result, such motion compensated interpolated frames based on the input frames appear to have significant artifacts. For frames with strong motion blur, it is more desirable to implement frame repetition.

Figure 2:
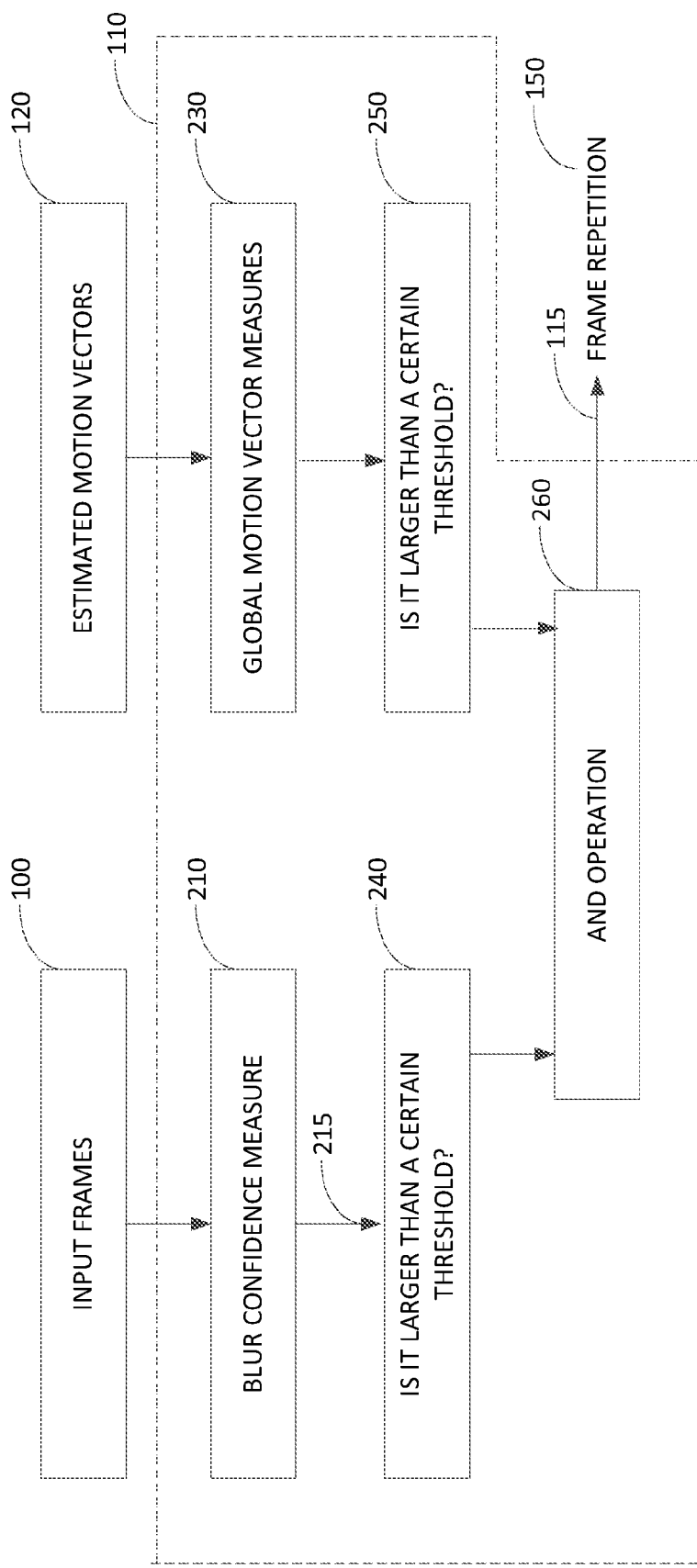
FIG. 2 illustrates a framework for detecting low quality input frame.

Referring to FIG. 2, with the aforementioned motivations, the system may detect the strength of the motion blur of low quality input frames 110 using one or more characteristics. For example, the following two features may be used to detect the strength of the motion blur. First a blur strength, in the form of a blur confidence measure 210, measured over one or more of the input frames 100. Second a presence of fast motion, in the form of global motion vector measures 230, dominating over large part of the frame.

The input frames 100 may be processed using the blur confidence measure 210. The blur confidence measure may be based on analysis of the image edges. Natural images generally contain four types of edges: (1) Dirac-Structure Edges, (2) Gstep-Structures, (3) Astep-Structures, and (4) Roof-Structures. When blurring occurs within the input frames 100, both Dirac-Structure and Astep-Structure edges tend to disappear and both Gstep-Structure and Roof-Structure edges tend to lose their sharpness. These edge types, and their sharpness, may be detected using an image analysis based on a wavelet transform.

Figure 3:
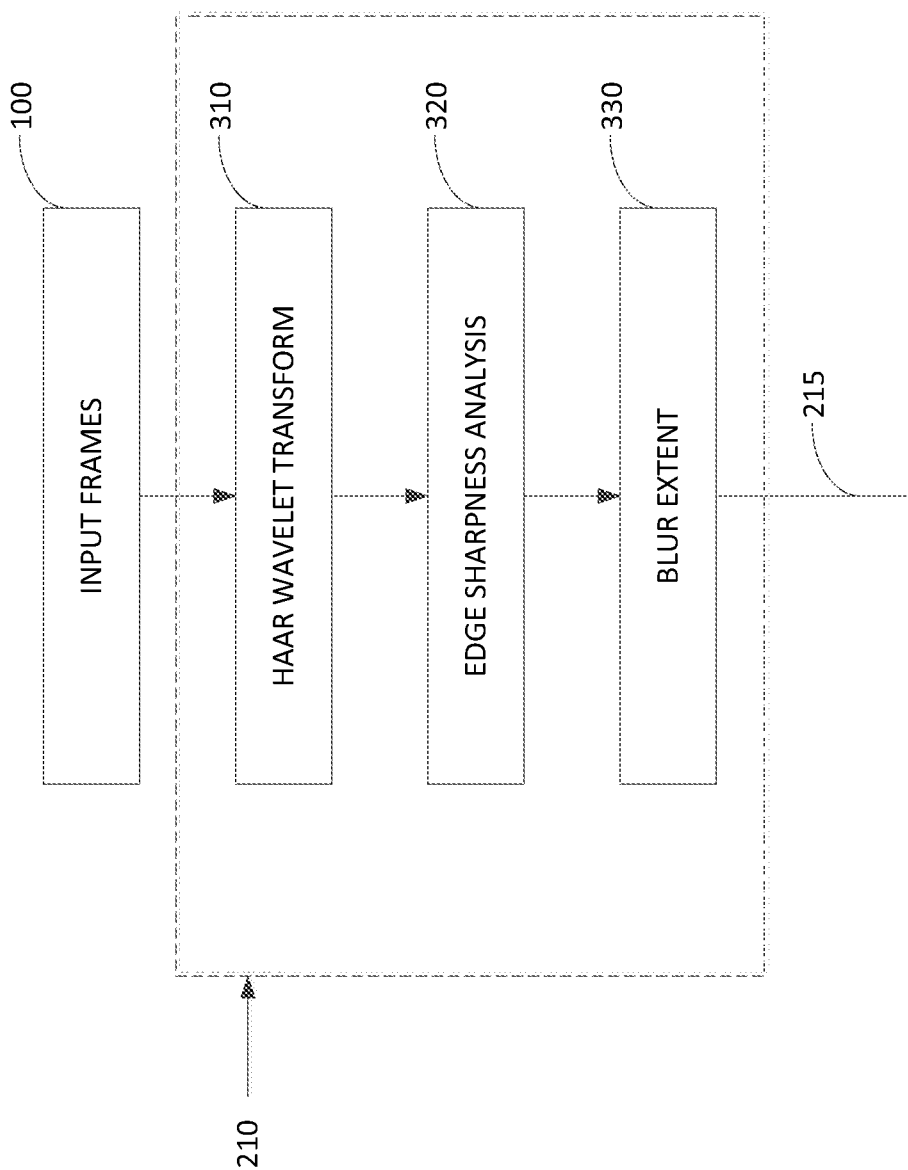
FIG. 3 illustrates a framework for determining a blur confidence measure.

Referring also to FIG. 3, the input frames 100 for the blur confidence measure 210 may be processed using a Haar wavelet transform 310 for edge detection. The Haar wavelet transform 310 may transform the input frames 100 to a selected decomposition level, such as 3. Based upon the HAAR wavelet transform 310 an edge map may be constructed based upon an edge sharpness analysis 320. The edge map may be constructed as follows, $\text{Emap}_i(k,l) = \sqrt{LH_i^2 + HL_i^2 + HH_i^2}$ (i=1, 2, 3). LH represents the low frequency domain in the horizontal direction and high frequency domain in the vertical direction. HL represents the high frequency domain in the horizontal direction and the low frequency domain in the vertical direction. HH represents the high frequency domain in both of the horizontal and vertical directions. The edge maps are partitioned to find local maxima in each window. The window size in the highest scale is 2 by 2, the next coarser scale is 4 by 4, and the coarsest one is 8 by 8. The result may be denoted as E $\max_i$ (i=1, 2, 3), where E $\max_i$ represents the intensity of the edge. For a given threshold, if E $\max_1(k,l)$>threshold or E $\max_2(k,l)$>threshold or E $\max_3(k,l)$>threshold, (k,l) is an edge point, where an example of the threshold is 35.

For any edge point, if E $\max_2(k,l)$>E $\max_1(k,l)$, (k,l) is Roof-Structure or Gstep-Structure and record the total number of Roof-Structure edges and Gstep-Structure edges to be $N_{rg}$.

For any Roof-Structure or Gstep-Structure edge point, if E $\max_1(k,l)$<threshold, (k,l) is considered to be in a blur image. Compute the total number of Roof-Structures and Gstep-Structure edges which lost their sharpness to be $N_{brg}$. A blur extent 330 may be computed as:

$$\frac{N_{brg}}{N_{rg}}.$$

The blur extent 330 provides a blur confidence measure 215. Alternatively, other techniques may be used to determine a blur confidence measure.

Referring again to FIG. 2, the estimated motion vectors 120 may be used to compute global motion vector measures 230. One exemplary technique may include computing the magnitude of the average of the horizontal component of the motion vectors and the average of the vertical component of the motion vectors, respectively. Alternatively, other techniques may be used. If the blur confidence measure 215 is larger than a threshold (e.g., 0.6 for the blur confidence) 240 and the output of the global motion vector magnitude 230 is larger than a threshold (e.g., 10 for the global motion vector magnitude) 250, the system may determine that the input frame contains strong motion blur due to fast global motion using an "AND" operation 260 with an output 115. Frame repetition may be ultimately selected 150, motion compensated interpolation may be selected. In the case of soft switching, a blur confidence measure (larger than a certain threshold) and a motion vector measure (larger than a certain threshold) may be combined using an arithmetic operation to determine an overall confidence measure for blending frame repetition and motion compensated frame interpolation.

Figure 4:
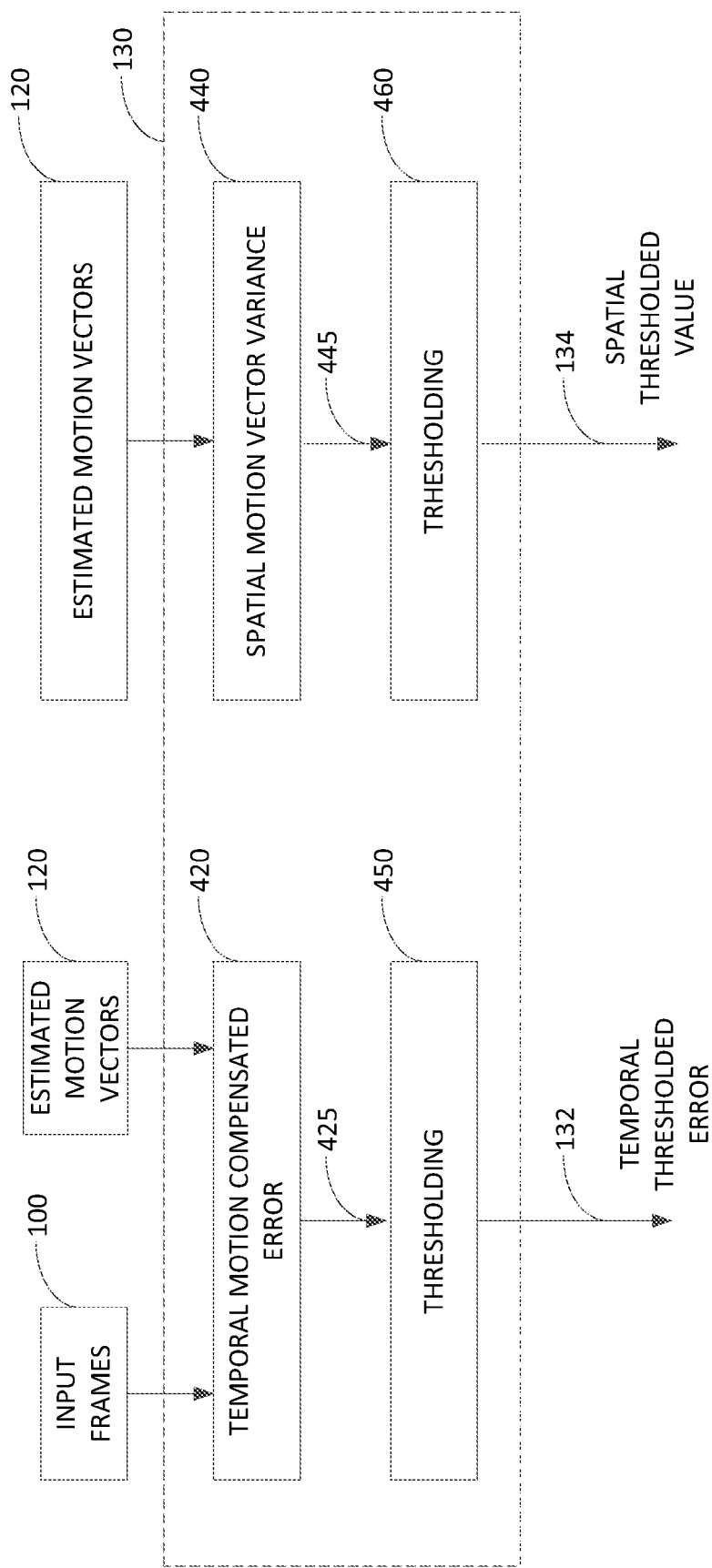
FIG. 4 illustrates a framework for detecting temporal and spatial motion vector errors.

Another criterion that may be used for the global fallback decision is the reliability of the estimated motion vectors. The reliability of the estimated motion vectors may be based upon the spatial and temporal error detection 130. Referring to FIG. 4, the spatial and temporal characteristics may be calculated in the temporal domain 420 based upon the input frames 100 and the estimated motion vectors 120, and with a spatial motion vector variance 440 in a spatial domain based upon the estimated motion vectors 120 to determine the reliability of the estimated motion vectors 120. The temporal errors 420 and the spatial variance 440 identify motion vector outliers or inaccurate motion vectors using a pair of thresholds 450, 460.

Figure 5:
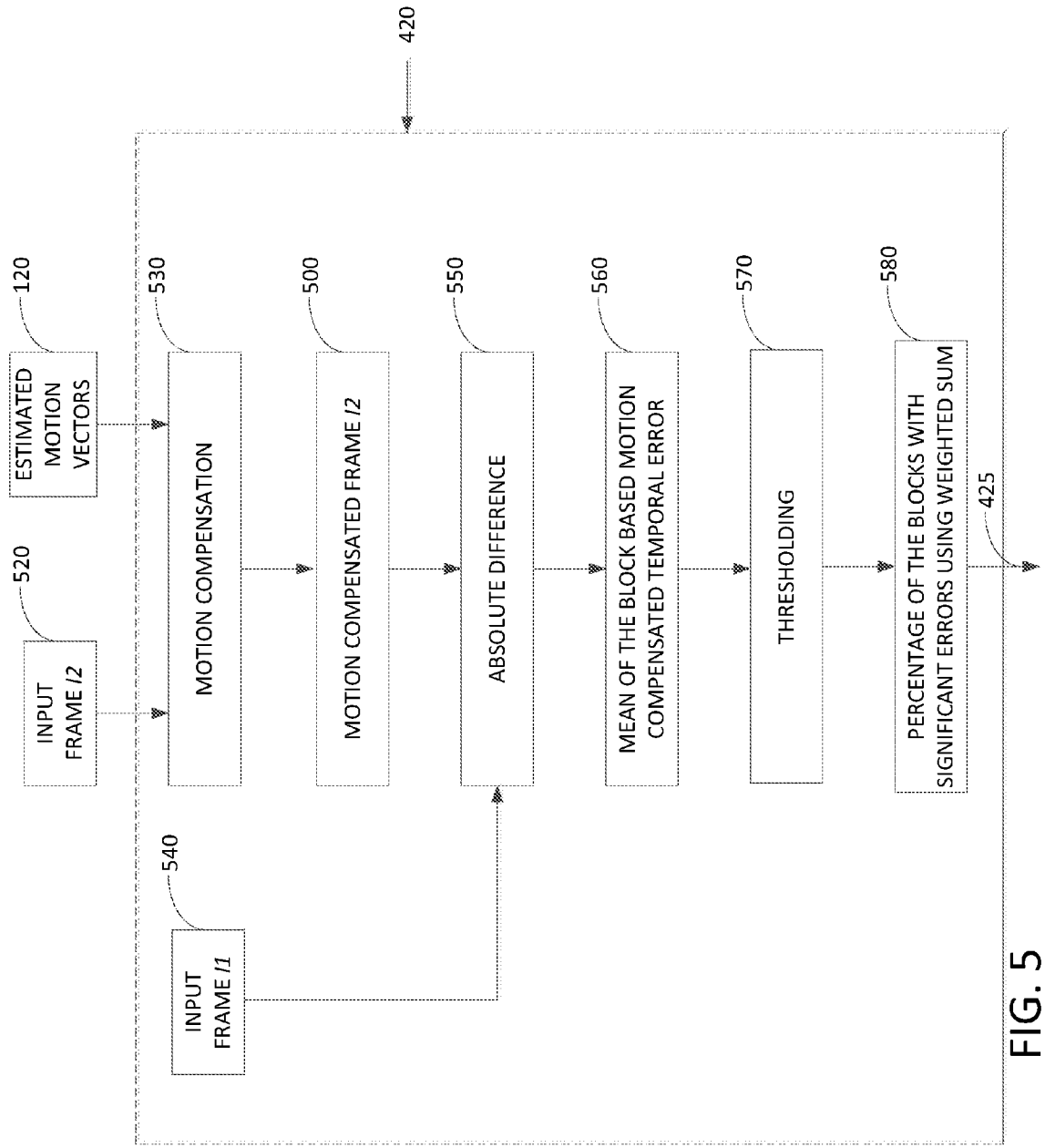
FIG. 5 illustrates a framework for temporal local error based upon detection for motion vector outliers or inaccurate motion vectors.

Referring to FIG. 5, an exemplary computation of the temporal motion compensated error 420 is illustrated. In particular, a motion compensated frame $\tilde{I}_2 = I_2(p+\text{round}(mvy(p,q)), q+\text{round}(mvx(p,q)))$ 500 is first generated using motion compensation 530 based upon the estimated motion vectors mvy, mvx 120 together with the input frame $I_2$ 520, where p and q are pixel coordinates.

An absolute difference 550 is computed between the motion compensated frame $I_2(p+\text{round}(mvy(p,q)), q+\text{round}(mvx(p,q)))$ 500 and $I_1(p,q)$ 540 by the following equation:

Error(p+round(0.5*mvy(p,q)),q+round(0.5*mvx(p,q)))
 =abs($I_1(p,q)-I_2(p$+round($mvy(p,q)),q$+round($mvx(p,q))$)).

The system may compute a mean for each non-overlapping (or overlapping) block in a set of blocks of the frame as a mean of the block based motion compensated temporal error 560. For example, the size of a non-overlapping block may be 11 by 11. If the mean of a block is larger than a threshold (e.g., 0.1), the block is identified as a block with potentially significant temporal errors. Accordingly, those blocks with the mean of the block based motion compensated temporal error 560 less than a threshold 570 are filtered out. The number of such blocks with significant temporal errors are counted. A weighted ratio between the number of blocks with significant temporal errors 570 and the total number of such blocks is determined 580. For example, a central block may have higher weights since the viewer may be more focused on the central area of the frame. Hence, central blocks may be more important to subjective quality. The resulting ratio 425 may be thresholded 450 to determine a temporal thresholded motion vector error 132.

Figure 6:
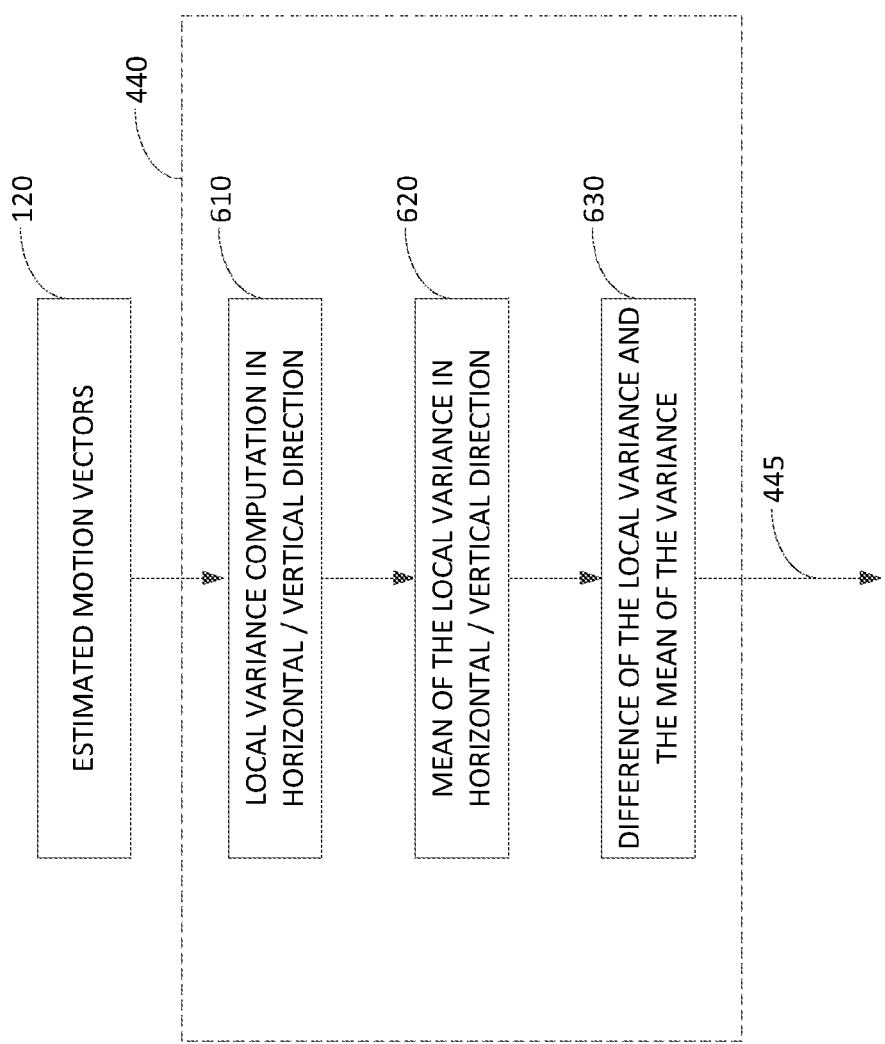
FIG. 6 illustrates a framework for spatial local error based upon motion vector detection.

Referring to FIG. 6, an exemplary computation of the spatial motion vector variance 440 is illustrated. A local variance of estimated motion vectors 120 in the horizontal and the vertical directions may be computed 610 for each block of the frame. For example, a block size of 15 by 15 may be used. A mean of the local variance in the horizontal and the vertical directions may be computed 620. The difference between the local variance 610 and the mean of the local variance 620 is computed 630. A variance value 445 is provided that may be thresholded 460 to provide a spatial thresholded error value 134.

Referring again to FIG. 1, one or more of these features may be combined in any suitable manner, such as an "OR" decision making 140 for the choice of global fallback in frame rate up conversion. For example, the decision making 140 may be an "or" operation, "max" operation, or "mean" operation based upon the output 115, or the temporal thresholded error 132, or the spatial thresholded error value 134 to select the frame repetition or the frame interpolation 160. In the case of soft switching, the final decision making process 140 may use these output values in a similar manner to determine the relative contribution of the frame repetition and motion compensated frame interpolation modes to the final output of the frame rate conversion system.

The terms and expressions which have been employed in the foregoing specification are used in as terms of description and not of limitation, and there is no intention, in the use of such terms and expressions, of excluding equivalents of the features shown and described or portions thereof, it being recognized that the scope of the invention is defined and limited only by the claims which follow.

We claim:

1. A method for frame rate conversion of a video comprising:
   (a) receiving a plurality of frames of said video;
   (b) detecting a low quality of a received frame of said video;
   (c) determining an interpolated frame of said video temporally proximate said frame of said video based upon said detecting said low quality of said received frame;
   (d) wherein said determining said interpolated frame of said video temporally proximate said frame of said video is based upon a reliability factor of motion vectors of said frame;
   (e) wherein said determining said interpolated frame based upon said reliability factor of said motion vectors is selectively used to (1) determine pixels of said interpolated frame using said motion vectors when reliability factor of said motion vectors of said frame is sufficiently high, and (2) not determine said pixels of said interpolated frame using said motion vectors when said reliability factor of said motion vectors of said frame is not said sufficiently high.

2. The method of claim 1 wherein said detecting said low quality said received frame is based on a blur confidence measure.

3. The method of claim 1 wherein said blur estimation is based upon a presence of fast motion dominating a large portion of said frame.

4. The method of claim 2 wherein said blur confidence measure is based on an analysis of edges of said frame.

5. A method for frame rate conversion of a video comprising:
   (a) receiving a plurality of frames of said video;
   (b) detecting a low quality of a received frame of said video;
   (c) determining an interpolated frame of said video temporally proximate said frame of said video based upon said detecting said low quality of said received frame;
   (d) wherein said determining said interpolated frame of said video temporally proximate said frame of said video is based upon a reliability factor of motion vectors of said frame;
   (e) wherein said detecting said low quality said received frame is based on a blur confidence measure;
   (f) wherein said blur confidence measure is based on an analysis of edges of said frame;
   (g) wherein said blur confidence measure is based on an analysis of the sharpness of said edges of said frame.

6. A method for frame rate conversion of a video comprising:
   (a) receiving a plurality of frames of said video;
   (b) detecting a low quality of a received frame of said video;
   (c) determining an interpolated frame of said video temporally proximate said frame of said video based upon said detecting said low quality of said received frame;
   (d) wherein said determining said interpolated frame of said video temporally proximate said frame of said video is based upon a reliability factor of motion vectors of said frame;
   (e) wherein said detecting said low quality said received frame is based on a blur confidence measure;
   (f) wherein said blur confidence measure is based on an analysis of edges of said frame;
   (g) wherein said blur confidence measure is based on a wavelet transform.

7. A method for frame rate conversion of a video comprising:
   (a) receiving a plurality of frames of said video;
   (b) detecting a low quality of a received frame of said video;
   (c) determining an interpolated frame of said video temporally proximate said frame of said video based upon said detecting said low quality of said received frame;
   (d) wherein said determining said interpolated frame of said video temporally proximate said frame of said video is based upon a reliability factor of motion vectors of said frame;
   (e) wherein said detecting said low quality said received frame is based on a blur confidence measure;
   (f) wherein said blur estimation is based upon a presence of fast motion dominating a large portion of said frame;
   (g) wherein said fast motion is based upon a magnitude of motion vectors of said frame.

8. The method of claim 7 wherein said fast motion is based upon a horizontal component of said motion vectors of said frame.

9. The method of claim 8 wherein said fast motion is based upon a vertical component of said motion vectors of said frame.

10. The method of claim 1 wherein said reliability factor of said motion vectors is a spatial error measure.

11. The method of claim 1 wherein said reliability factor of said motion vectors is a temporal error measure.

12. The method of claim 10 wherein said spatial error measure is a spatial motion vector variance.

13. The method of claim 11 wherein said temporal error measure is a temporal motion compensated error.

14. The method of claim 13 wherein said temporal motion compensated error is based upon a block based motion compensation.

15. A method for frame rate conversion of a video comprising:
    (a) receiving a plurality of frames of said vide;
    (b) detecting a low quality of a received frame of said video;
    (c) determining an interpolated frame of said video temporally proximate said frame of said video based upon said detecting said low quality of said received frame;
    (d) wherein said determining said interpolated frame of said video temporally proximate said frame of said video is based upon a reliability factor of motion vectors of said frame;
    (e) wherein said reliability factor of said motion vectors is a temporal error measure;
    (f) wherein said temporal error measure is a temporal motion compensated error;
    (g) wherein said temporal motion compensated error is based upon a block based motion compensation;
    (h) wherein said temporal motion compensated error includes weighting central blocks of said frame to a greater degree than non-central blocks of said frame.

16. A method for frame rate conversion of a video comprising:
    (a) receiving a plurality of frames of said video;
    (b) detecting a low quality of a received frame of said video;
    (c) determining an interpolated frame of said video temporally proximate said frame of said video based upon said detecting said low quality of said received frame;
    (d) wherein said determining said interpolated frame of said video temporally proximate said frame of said video is based upon a reliability factor of motion vectors of said frame;
    (e) wherein said reliability factor of said motion vectors is a spatial error measure
    (f) wherein said spatial error measure is a spatial motion vector variance;
    (g) wherein said spatial motion vector variance includes a comparison between a local variance and a global mean of said local variance.

* * * * *

UNITED STATES PATENT AND TRADEMARK OFFICE
CERTIFICATE OF CORRECTION

PATENT NO. : 9,602,762 B2  Page 1 of 1
APPLICATION NO. : 14/738056
DATED : March 21, 2017
INVENTOR(S) : Xu Chen and Petrus J. L. van Beek It is certified that error appears in the above-identified patent and that said Letters Patent is hereby corrected as shown below:

In the Claims

Column 7, Line 17:
Change "vide" to read –video–.

Signed and Sealed this
Thirteenth Day of June, 2017

Joseph Matal
*Performing the Functions and Duties of the*
*Under Secretary of Commerce for Intellectual Property and*
*Director of the United States Patent and Trademark Office*